C. W. DAVIS.
FASTENER FOR COVERS.
APPLICATION FILED MAR. 6, 1919.

1,394,672.

Patented Oct. 25, 1921.

Inventor:
Cortland W. Davis
By Edson & Steward
Attorneys

UNITED STATES PATENT OFFICE.

CORTLAND W. DAVIS, OF CHICAGO, ILLINOIS, ASSIGNOR TO THE MANTLE LAMP COMPANY OF AMERICA, OF CHICAGO, ILLINOIS, A CORPORATION OF ILLINOIS.

FASTENER FOR COVERS.

1,394,672.             Specification of Letters Patent.        Patented Oct. 25, 1921.

Application filed March 6, 1919. Serial No. 280,979.

*To all whom it may concern:*

Be it known that I, CORTLAND W. DAVIS, a citizen of the United States, residing at Chicago, in the county of Cook and State of Illinois, have invented certain new and useful Improvements in Fasteners for Covers; and I do hereby declare the following to be a full, clear, and exact description of the invention, such as will enable others skilled in the art to which it appertains to make and use the same.

The invention relates to fasteners which may be employed to secure covers to vessels, although the utility thereof is not confined to this particular use; and its object is to provide a simple, cheap, and effective locking device for employment in such situations as require security in the sealing of vessels containing food, or other perishable commodities.

The device in which the invention has been embodied, and which is revealed herein, consists of a clamp which is applicable to many types of vessels, and is, further-more, adapted to be separately manufactured and sold as a unit.

The fastener includes, as its principal element, a metallic clamping portion which is adapted to be pivotally secured to the body of a vessel, and to engage the cover of the vessel, or other separable part thereof, to thereby secure said cover or part in place, there being associated with said clamping portion an actuating element, preferably consisting of a headed screw-threaded bolt which is adapted to be secured to the wall of the vessel, and of a thumb nut for operating the clamp. A reinforcing band, encircling the vessel, may be employed as an anchorage for the bolt. The pivotal connection for the clamp, may, as shown, consist of headed rivets, secured in the body of the vessel and loosely fitting openings of the clamp. The thumb nut may be provided with a depression inclosing the head of the bolt, to thereby admit of the employment of a relatively short bolt. The clamp may be provided with a groove to interlock with a part of the cover, which part may be in the form of a bead carried by a marginal flange of the cover.

The fastener may be employed with a vessel having a hinged cover, or several spaced fasteners may be used if the cover is without a hinge. A hinge of link form is advantageous, inasmuch as freedom of movement is desirable while seating the cover and bringing it within reach of the clamp. A hinge of that type, as illustrated in the drawing, has been devised, the link thereof being of such form as to allow universality of movement between the vessel and cover, and also to direct the cover, to a certain extent, to its closing position on the vessel.

Referring to the drawings—

Figure 1:
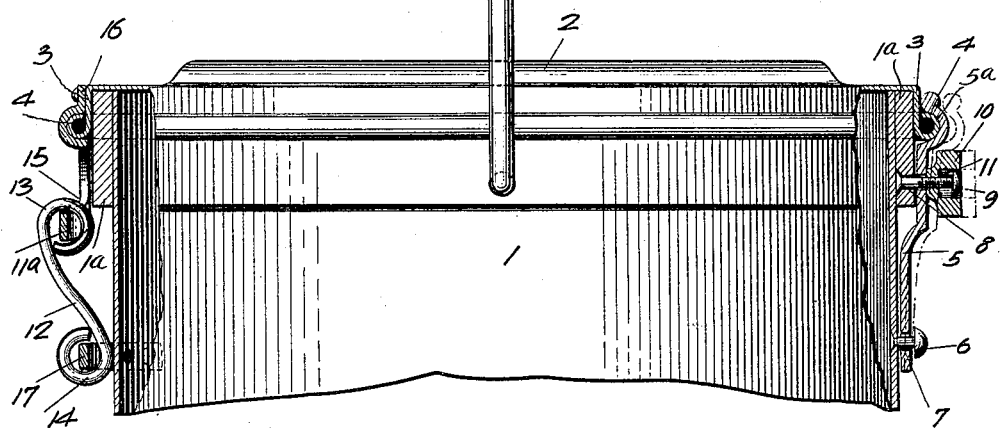
Figure 1 represents the top of a vessel, and a cover secured in position by a link hinge and by one of the fasteners.

1 is a vessel, the upper end of which is encircled by a reinforcing band $1^a$. This reinforcing band may be permanently associated with the vessel, or it may be an independent element which is capable of being applied to a vessel which is unprovided with a reinforcing band.

2 is a cover for the vessel which, as shown, is provided with a marginal depending flange 3 of sufficient size to encircle the reinforcing band. The flange 3 is provided with a bead 4 which not only strengthens said flange, but affords means for the engagement of the clamp.

5 is the clamp, the lower end of which is flexibly pivoted to the vessel by headed rivets 6, or only one of such rivets, which loosely fit openings 7 in the lower end of the clamp.

The actuating means for the clamp is a bolt 8, having a head 9, and a thumb nut 10 which is provided with a depression 11 for receiving and inclosing the head 9 of the bolt. The bolt is preferably anchored in the reinforcing band $1^a$, the fixed end thereof being upset or headed and disposed in a countersunk depression on the inside of the reinforcing band.

The principal features of the fastener are, therefore, the reinforcing band $1^a$, the clamp 5, the flexible pivot, which may consist of the rivets 6 and the openings 7, and the actuating means for the clamp which, in the revealed form of the invention, may be the headed bolt 9 and the thumb nut 10.

The clamp 5 having the openings 7, and associated with the bolt 9 and thumb nut 10, with or without the reinforcing band 1ª, may be manufactured and sold for the use of those who may desire to equip vessels with a simple, cheap and readily applicable locking device. Where the clamp is provided with an internal groove 5ª at its upper end, and the cover of the vessel is provided with a bead, such as 4, the groove and the bead will effectuate an interlocking engagement, thereby effectually holding the cover in position until the fastener is released.

The depression 11 of the thumb nut 10, admits of the use of a short bolt, and, furthermore, renders the device more compact than it would otherwise be. It will be understood, that it is undesirable to have the fastener for a cover project any considerable distance beyond the wall of the vessel to which it is attached, since, if unduly projecting outward, it is liable to be injured by contact with extraneous objects.

It is proposed to employ as many of the pivoted clamps as may be found necessary to securely lock the cover to the vessel, and the clamps, if plural in number, will be disposed at intervals around the circumference of the cover, so as to equalize the strains. Two diametrically arranged clamps will ordinarily be sufficient to firmly secure the cover in place.

Figures 2, 3:
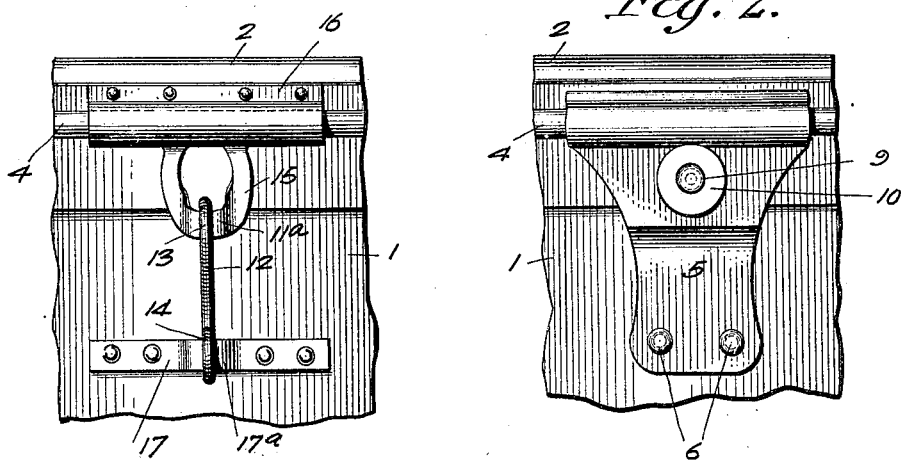
Fig. 2 is a fragmentary view showing a fastener in elevation.
Fig. 3 is a fragmentary view showing the link hinge in elevation.

Instead of using two clamps, a single clamp, set diametrically opposite a hinge, may be employed. This hinge, for convenience of manipulation, may be in the form of a link which is suitably connected to the vessel and the cover. Such a hinge is shown in Figs. 1 and 3, wherein 12 is the link having reversed eyes 13, 14 at its upper and its lower extremity. The upper eye 13 is loosely secured in the outwardly bent lower end of a clip 15, which end has a seat 11ª to center the link 12. The body of the clip is so shaped as to fit the bead 4 of the cover to which its upwardly extending edge 16 is riveted, or otherwise secure.

The lower eye 14 is loosely connected to the bent portion 17ª of a strap 17, this strap being riveted or otherwise fixedly secured to the body of the vessel.

A hinge, thus constructed, is strong and durable, and also flexible. It will not interfere with the removal of the cover from the top of the vessel, although it will retain the cover in a pendent position beside the vessel and within easy reach. The pendent position of the cover when not in use, leaves the margin of the vessel free from any projection, such as a hinge of ordinary character, and enables the operator to pour out the contents of the vessel at any side thereof.

Having thus described my invention, what I claim as new and desire to secure by Letters Patent is:

1. An article of manufacture, comprising a clamping element having a pivot hole, a clamping end, and an opening for a securing device disposed between said hole and said end.

2. An article of manufacture, comprising a clamping element having a pivot hole, a clamping end, an opening for a securing device disposed between said hole and said end, a securing device extending through said opening, and means associated with said securing device for actuating said clamping element.

3. An article of manufacture, comprising a clamping element adapted to interlock with a cover, securing means extending through said clamping element, and actuating means carried by said securing means.

4. An article of manufacture, comprising a clamping element adapted to interlock with a cover, a headed bolt extending through said clamping element, and a nut carried by said bolt.

5. An article of manufacture, comprising a clamping element, a headed bolt extending through said clamping element, and a nut carried by said bolt and provided with a depression inclosing the head of said bolt.

6. An article of manufacture, comprising a clamping element, a reinforcing band, a headed bolt extending through said clamping element and said band, and actuating means carried by said bolt.

7. An article of manufacture, comprising a clamping element, a reinforcing band, and actuating means for said clamping element anchored in said band.

8. An article of manufacture, including clamp-actuating means comprising a headed bolt, and a thumb nut carried by said bolt and having a cavity inclosing the head of said bolt.

9. The combination of a vessel having a removable part, of a fastener for said part, consisting of a flexibly mounted clamp for engaging said removable part, and means additional to said clamp for actuating it.

10. The combination with a vessel and a cover therefor, of a flexibly mounted clamp for said cover provided with means to interlock with said cover, and an adjustable securing device for said clamp.

11. The combination with a vessel and a cover therefor having a marginal bead, of a flexibly mounted clamp provided with a groove to receive said bead, and an adjustable securing device for said clamp.

12. The combination with a vessel having a reinforcing band, and a cover for said vessel, of a flexibly mounted clamp provided with means to interlock with said cover, and an adjustable securing device for said clamp extending from said band.

13. The combination with a vessel, of a clamp for directly engaging a removable part thereof, said clamp being flexibly secured to the vessel by a loose rivet joint.

14. The combination with a vessel and a cover therefor, of a link hinge for said cover, and a clamp adapted to interlock with said cover.

In testimony whereof I affix my signature.

CORTLAND W. DAVIS.

Witness:
V. S. JOHNSON.